United States Patent [19]
Fleck

[11] Patent Number: 4,979,364
[45] Date of Patent: Dec. 25, 1990

[54] DIESEL FUEL EXHAUST GAS FILTER

[76] Inventor: Carl M. Fleck, Doktorberg 23 E5, A-2391 Kaltenleutgeben, Austria

[21] Appl. No.: 317,961

[22] Filed: Mar. 2, 1989

[30] Foreign Application Priority Data

Mar. 11, 1988 [AT] Austria .................................. 671/88
Nov. 30, 1988 [AT] Austria ................................. 2947/88

[51] Int. Cl.$^5$ .......................... F01N 3/02; B03C 1/00; B03C 3/00
[52] U.S. Cl. ........................................... 60/274; 55/3; 55/96; 55/100; 55/131; 55/138; 55/466; 55/DIG. 30; 60/275; 60/303; 60/311
[58] Field of Search ................ 60/275, 274, 303, 311; 55/3, 100, 96, 131, 138, 466, DIG. 30

[56] References Cited

U.S. PATENT DOCUMENTS

| | | | |
|---|---|---|---|
| 2,989,144 | 6/1961 | Styrie | 55/138 |
| 3,558,286 | 1/1971 | Gourdine | 60/275 |
| 3,581,489 | 6/1971 | Camin | 60/275 |
| 4,170,447 | 10/1979 | Goldstein | 55/3 |
| 4,376,637 | 3/1983 | Yang | 55/131 |
| 4,441,971 | 4/1984 | Ishiguro | 60/275 |
| 4,871,515 | 10/1989 | Reichle | 60/275 |

FOREIGN PATENT DOCUMENTS 554303 3/1958 Canada .................................. 55/100

Primary Examiner—Douglas Hart
Attorney, Agent, or Firm—Kurt Kelman

[57] ABSTRACT

Soot particles are separated from diesel exhaust gases and burned by passing them in a direction of flow through a cellular filter open at both ends and comprised of honeycomb-shaped cells, and subjecting the soot particles to an electric or magnetic field before the soot particles are burned. The honeycomb-shaped cells are very wide transversely to the direction of flow and very flat in the direction of flow, and the webs of the honeycomb-shaped cells extending in the direction of flow are very thin.

22 Claims, 6 Drawing Sheets

DIESEL FUEL EXHAUST GAS FILTER

BACKGROUND OF THE INVENTION

(1) Field of the Invention

The present invention relates to a method of, and an apparatus for, the separation of soot particles from diesel fuel exhaust gases before the separated soot particles are burned.

(2) Description of the Prior Art

All conventional techniques for burning the soot particles contained in diesel fuel exhaust gases operate on the principle of first separating the soot particles in a filter and then burning the separated soot particles. For example, an electrofilter with annular electrodes is used and the relatively large soot particles are separated by a centrifugal separator and returned to the suction inlet with a partial stream of the exhaust gases. It has been found that such soot particles cause an unacceptably high abrasive wear of the pistons and cylinders in the diesel engine. It has also been proposed to use cellular filters with adjoining long filter cells, which preferably have a qaudratic cross section and whose inlets and outlets are alternately closed by a plug. The exhaust gases to be filtered pass through the common porous wall of two adjoining cells while the aerosols cannot pass through the pores of the walls and are deposited in that cell whose inlet is open. Such filters have been made of high temperature resistant ceramic materials and are preferably coated or doped with catalytic substances so that the separated soot particles will be burned at a temperature below 700° C. in the presence of an excess of oxygen. Since such temperatures are reached only when the engine operates at very high speed, considerable deposits producing counter-pressures to the flow of the exchaust gases are built up during the periods when the engine does not operate at very high speed, which reduces the output of the engine in an unfavorable manner. In addition, the pores in the cell walls of the filter are covered by the non-combustible metallic impurities in the soot particles, thus producing a non-reversible counter-pressure build-up in the exhaust gas filter over the long run. Furthermore, the plugs of the outlets are eventually worn down so that the filter in time becomes increasingly more permeable.

SUMMARY OF THE INVENTION

It is the primary object of this invention to overcome these disadvantages.

The above and other objects are accomplished according to the invention by separating the soot particles by passing time in a direction of flow through a cellular filter open at both ends and comprised of honeycomb-shaped cells, and subjecting the soot particles to an electric and/or magnetic field before the soot particles are burned. The field extends perpendicularly to the direction of flow.

In the apparatus for carrying out this separation of the soot articles, the honeycomb-shaped cells are very wide transversely to the direction of flow and very flat in the direction of flow, and the webs of the honeycomb-shaped cells extending in the direction of flow are very thin.

If the field is an electric field, the high votage applied to generate the field is used to deliver ohmic heat due to the inner resistance of the ceramic filter material to the electric field, and this ohmic heat serves to burn the soot particles.

The extent of separation is considerably enhanced if the soot particles are electrically charged before they pass into the filter. Because of this generally multiple charge and of the strong currents prevailing in the narrow filter cells, the extent of separation depends very little on the velocity of the flow. The rough surface characteristics of the ceramic material used for the filter considerably increase the thickness of the border layer as well as the adhesive forces of the separated soot particles. The burning of the soot particles should proceed continuously or at least at short intervals of time so that these adhesive forces are not exceeded. The high heat energy required for a continuous bringing of the soot particles is reduced by the very compact honeycomb structure of the filter and may be further reduced by increasing the discharge of the soot. The intervals between burning the soot may be considerably extended if the surface roughness of the ceramic filter is increased during its manufacture.

If an electric field is used for the separation, the filter material must have a high specific resistance. In this case, care must be taken that the electric field in the interior of the cellular filter is obtained by an electrical polarization of the dielectric material. This produces a partial compensation of the dielectric surface charge by the separated charged aerosol, and the polarity of the field applied from the outside and/or the charge of the aerosol must be reversed to maintain or re-establish the corresponding field and/or to compensate for the separated charge. The required frequency of the polarity reversal is a function of the concentration and the average charge of the soot particles, and the dielectric characteristics of the material.

When the dielectric surface charge is saturated, the outer field may be disconnected. In this way, the separated charges become effective again and may cause a further separation for a certain time because of the field produced thereby.

The separation works even better if the polarity of the gas discharge and thus that of the aerosol charge is reversed at the separation plates. This can be readily achieved by reversing the voltage in the discharge path ahead of the filter, particularly if the discharge path is defined between discharge electrode wires and cylindrical counter-electrodes. It is particularly advantageous if the counter-electrodes are arranged upstream of the discharge electrodes because this causes the charged soot particles, which have little mobility, not to reach the counter-electrodes and to be fed to the filter in the exhaust gas stream. The discharge wires may be cleaned from time to time by burning through grounding them and applying a positive or negative high voltage to the counter-electrodes.

If the separation is effected by a magnetic field, the relative movement of the charged particles in the gas between the collisions with the gas molecules, i.e. within their free path, produces a circular track segment due to the Lorentz field. After the impact, they fly in another direction but their path still is bent according to the Lorentz field. Macroscopically, the direction of the flowing gas remains as the resultant of all these track segments and the resultant of all the circular deviations produces a drifting of the charged soot particles according to the Lorentz field as vector product of flow vector and magnetic field vector, i.e. in a direction perpendicular to the direction of flow and of the magnetic field lines. Since the effect is small because of the large mass of soot particles, very fine filter cells are required, at least in the direction of the transverse drift. The force of the magnetic field must be determined experimentally on the basis of the cell diameter in the direction of the drift, the diameter of the pole shoe and the velocity of the gas flow because the charge of the aerosol plays an essential role and is determined by the arrangement and the operating voltage of the gas discharge path.

Although separation by an electric field is more efficient, it also has considerable disadvantages. The ceramic material of the filter must have a high specific resistance even at high temperatures since otherwise no electric field can be built up in the pores of the ceramic material. Therefore, no metallic catalytic coating may be used and the temperature of combustion of the soot rises above 650° C. But even in catalytically coated filters, the required combustion temperature for the soot can be reached only in warmer climates and after the engine has run at high speeds for an extended time so that auxiliary heating may be needed.

This disadvantage is obviated according to one embodiment of the invention by delivering ohmic heat to the cellular filter due to the inner resistance of the filter to an electrical field applied to the filter. In this case, the electrodes used to apply the electrical field for the separation of the soot particles may also be used for delivering the heating current. Since the direction of separation along the field lines is the same as that of the heating current flow, the resistance to the passage of the soot particles through the filter is not substantially increased by the particle charge because the separation of the particles is effected only on the surfaces extending perpendicularly to the direction of the field.

The operating temperature may be controlled by the current voltage characteristic line or by temperature sensors in the ceramic material of the filter or the gas stream downstream of the filter. In particular, by controlling the high voltage generating the electric field and the resultant development of ohmic heat in the filter, the operating temperature of the diesel fuel exhaust gas filter during the separation of the soot particles may be maintained in a range assuring the combustion of the separated soot particles while the separation continues, and this operating temperature may be held at a level above that of the exhaust gases entering the filter.

This control during the separation is made possible according to the invention because the filter has a very high separation efficiency over a large field, i.e. high votage, range and the effective resistances of the filter arrangement in these temperature ranges lie between 1kΩ and 10MΩ. Of course, the filter may also have shapes operating at a separation voltage of 1 kV or less, in which case the filters should generally have resistances in the range of 100Ω and 10kΩ.

Ceramic materials with specific resistances permitting such a control in the temperature range of 600° C. and 800° C. are commercially available. Furthermore, the resistance of the filter may be further adjusted by selection of appropriate dimensions, the shape of the filter cells in honeycomb filters, more particularly the proportion of the cell widths and lengths, or the thickness of the webs between the cells in rectangular honeycomb filters.

If it is desired to increase the resistance of the honeycomb filter in the direction of the field, which may be necessary at higher operating temperatures, the short webs extending in the field direction are not arranged in a continuous line according to one feature of the invention but are staggered in the successive rows of cells so that the geometry of the honeycomb structure is similar to that of the bricks in a brick wall.

BREIF DESCRIPTION OF THE DRAWING

The above and other objects, advantages and features of the present invention will become more apparent from the following detailed description of certain now preferred embodiments thereof, taken in conjunction with the accompanying, generally schematic drawing wherein FIG. 1a schematically illustrates a conventional honeycomb filter;

DETAILED DESCRIPTION OF PREFERRED EMBODIMENTS

Figure 1A:
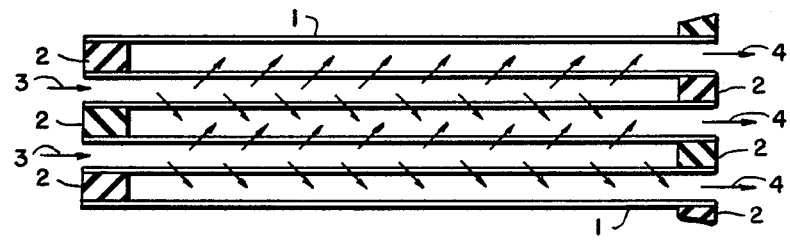
FIG. 1b is a similar view of the diesel fuel exhaust gas filter of this invention.

Referring now to the drawing and first to the schematic longitudinal cross section of FIG. 1a, there is shown a conventional diesel fuel exhaust gas honeycomb filter of a type presently in use in diesel-powered automobiles. The filter channels through which the exhaust gases flow are defined by thin, porous ceramic webs 1 generally of qaudratic cross section, and the inlet and outlet ends of the channels are alternately closed by plugs or stoppers 2 so that exhaust gas 3 flowing through an open inlet end of a channel whose outlet end is closed is forced to penetrate through the porous ceramic webs 1 into the adjacent channel open at its outlet end. As the exhaust gas loaded with soot particles passes through the porous ceramic webs (see oblique arrows), the soot particles are deposited in the pores of the webs and exhaust gas 4 leaves the filter free of soot particles.

Figure 1B:
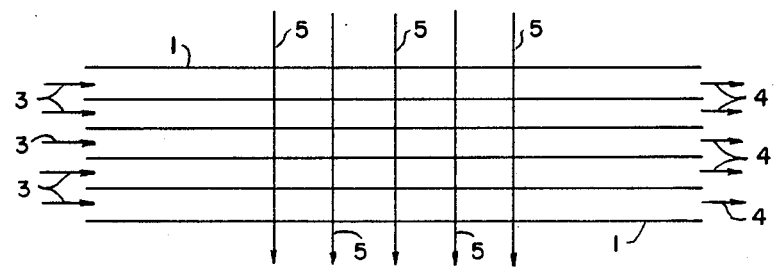

The operation of a diesel fuel exhaust gas filter according to the invention is schematically illustrated in FIG. 1b. As shown, the gas flow channels of this filter are open at both ends so that the exhaust gas may freely pass therethrough. Only the electrically charged soot particles contained in inflowing exhaust gas 3 are moved against webs 1 under the force of field vectors 5 and are deposited in the web pores so that exhaust gas 4 leaves the filter purified. If the field is a magnetic field, the separating force operates perpendicularly to the direction of the gas flow and perpendicularly to illustrated field vectors 5, i.e. perpendicularly to the plane of the drawing. If an electric field is applied, the separating force is effective along illustrated field vectors 5, i.e. in the plane of the drawing.

Figure 3:
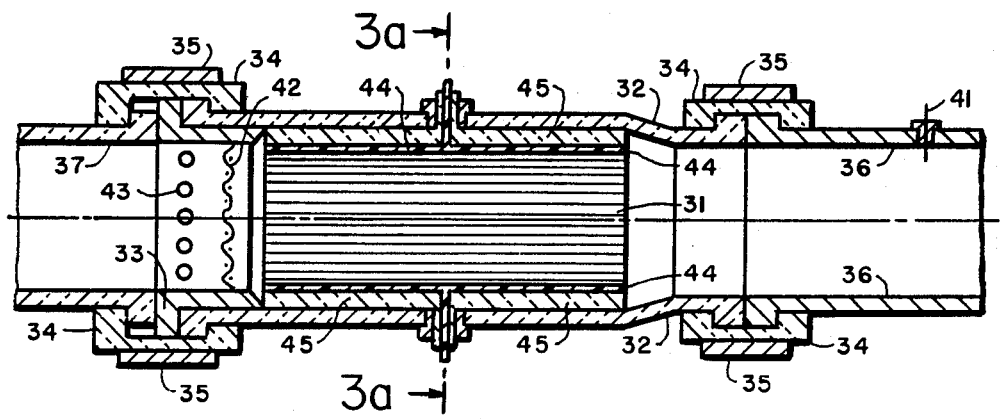
FIG. 3 shows an axial section of such a diesel fuel exhaust gas filter with an electric field and ohmic resistance heating.

FIG. 3 schematically illustrates diesel fuel exhaust gas honeycomb filter 11 contained in ceramic sleeve 12 and fixed in position by spacing ring 13. This spacing ring at the same time receives a gas discharge path comprised of discharge wires 22 cylindrical counter-electrodes 23. Ceramic sleeve 12 is attached and to exhaust pipes 16, 17 by divided ceramic sockets 14 and clamping rings 15. Exhaust gas elbow 17 is preferably made of a ceramic or partially ceramic material to enable the filter to be maintained at as high a temperature as possible and to receive less heat from the induction heater whose heating coils 18 are embedded in ceramic support 19. A magnetic field is applied to the filter by stationary magnet 20 which is slid form the side of exhaust pipe 16 over ceramic socket 14 and clamping ring 15 onto ceramic support 19 of the induction heater. The output of the induction heater may be controlled by a heat sensor 21 which measures the temperature of the exhaust gases flowing out of the filter through exhaust gas pipe 16 and, in response to the measured temperature, maintains the temperature of the filter and the soot particles separated therein at a constant level required for the catalytic combustion of the soot. If the combustion proceeds continuously, a temperature control may not be required, considering that only electrically conductive substances will be heated by the induction heater. In the present case, this is only soot and no electrically conductive substances will remain in the filter after the soot has been burned.

As shown in the drawing, the separation efficiency of the filter is enhanced by providing a gas discharge path upstream of the filter for applying an electrical charge to the soot particles, this discharge path being defined by discharge wires 22 and cylindrical counter-electrodes 23, the discharge wires extending parallel to each other and to the cylindrical counter-electrodes. Without the gas discharge path preceding the filter, the separation efficiency varies between about 50% to 70%, depending on the construction of the filter and its operating characteristics, but the provision of the gas discharge path increases this efficiency to about 90% to 98%.

Figure 2:
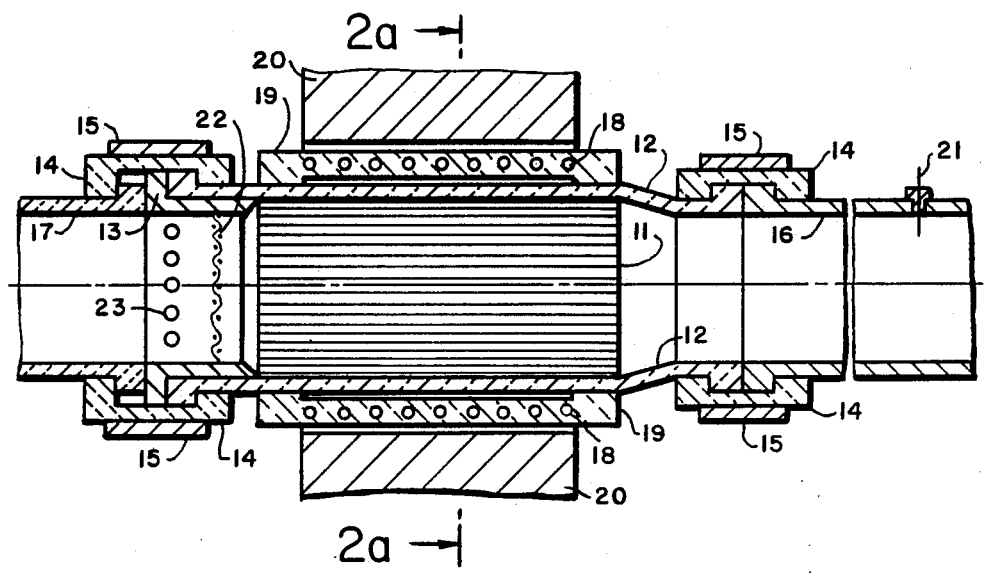
FIG. 2 shows an axial section of such a diesel fuel exhaust gas filter with a magnetic field and inductive heating.
Figure 2A:
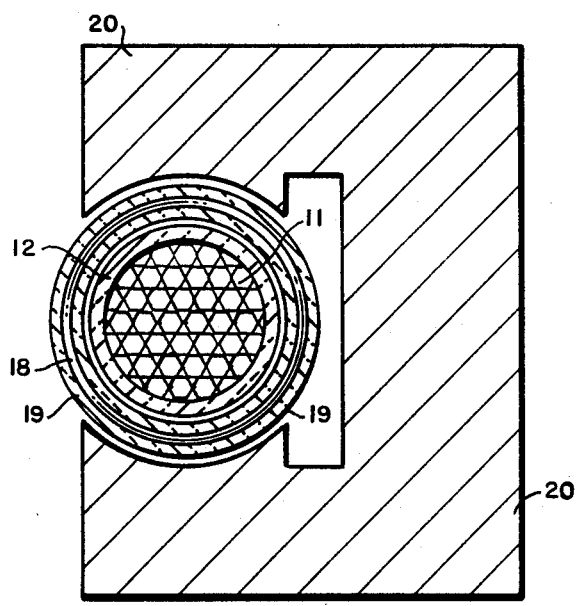
FIG. 2a is a cross section along line A—A of FIG. 2.

As can be seen in the cross section of FIG. 2a, the pole shoes of stationary magnet 20 are curved to conform to the circular circumference of ceramic support 10 for induction heating coils 18.

Figure 3A:
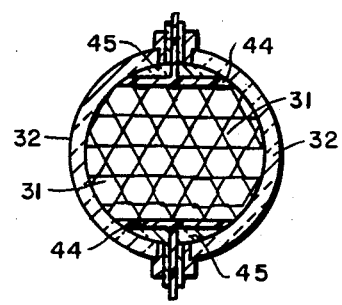
FIG. 3a is a cross section along line A—A of FIG. 3.

The field applied to diesel fuel exhaust gas filter 31 shown in FIGS. 3 and 3a is an electric field which also supplies ohmic heat to the filter. Similarly in structure and operation to the embodiment of FIG. 2, honeycomb filter 31 contained in ceramic sleeve 32 is fixed in position by spacing ring 33. This spacing ring at the same time receives a gas discharge path comprised of discharge wires 42 and cylindrical counter-electrodes 43. Ceramic sleeve 32 is attached to exhaust pipes 36, 37 by divided ceramic sockets 34 and clamping rings 35. An electric field is applied to the filter by a pair of electrode plates 44, the filter being cut at two opposite sides in planes extending parallel to each other and to the axis of the cylindrical filter, which filter sides are engaged by the electrode plates. As shown, the electrode plates are connected to a source of high voltage. Two ceramic segments 45 are placed between the parallel sides of the filter and ceramic sleeve 32. Temperature sensor 41 maintains the temperature of the filter and the soot particles separated therein at a controlled level.

Figure 4:
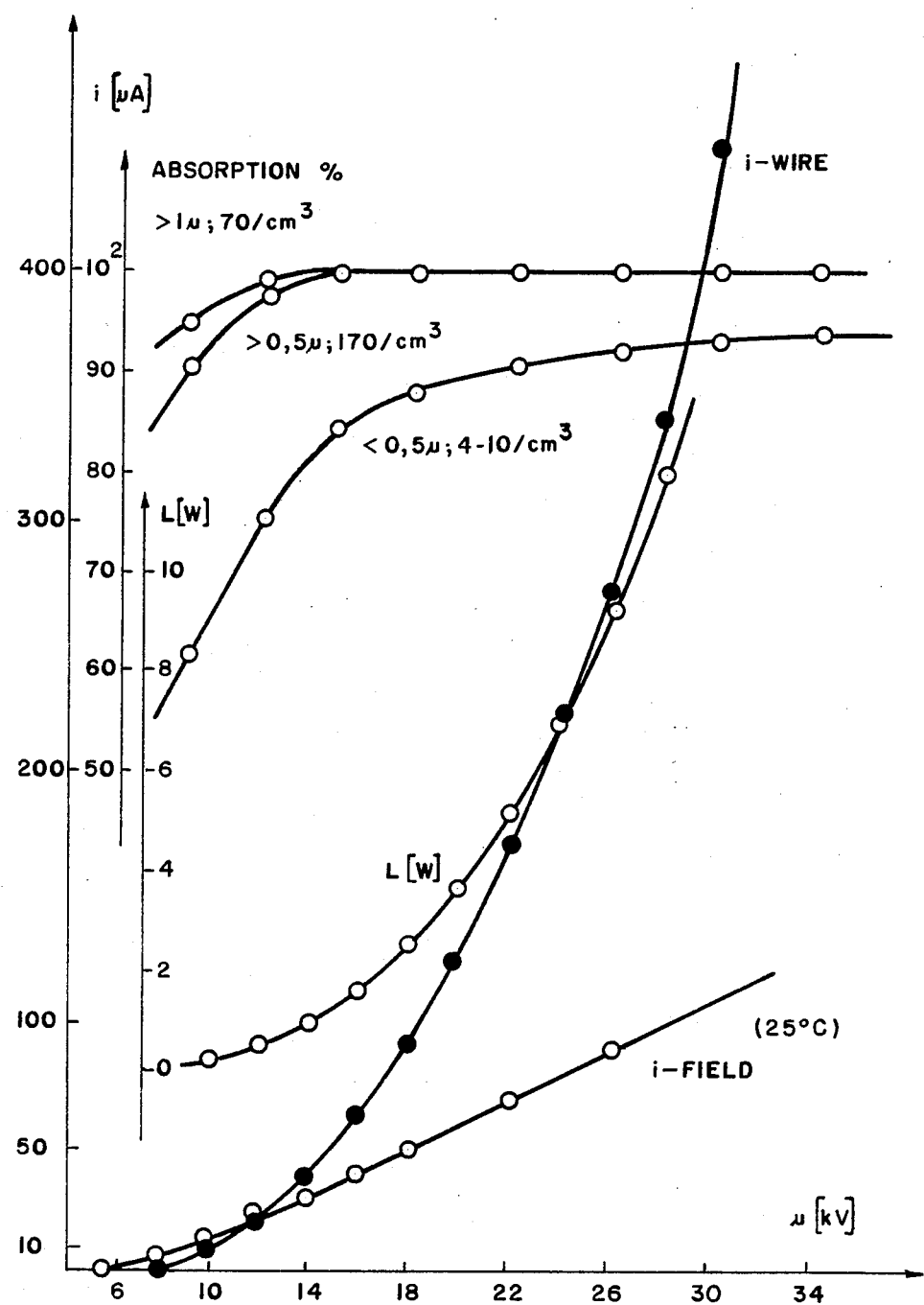
FIG. 4 is a diagram showing the power consumption and the absorption characteristic lines of the filter of FIG. 3 as a function of the high voltage applied to the filter.

The diagram of FIG. 4, which shows the operation of the filter of FIG. 3, indicates the current flowing through ceramic filter 31 at 25° C. (the i-field curve), the discharge current at the ionizing wires 42 (the i-wire curve), the power absorbed by both (the L curve) and the measured absorption probabilities (absorption curve) for three particles sizes: smaller than 0.5 $\mu$m, larger than 0.5 $\mu$m and larger than 1 $\mu$m. All these parameters are shown in relation to the independently varying high voltage U applied together to the ionizing wire and to the filter.

Noteworthy is in particular the high absorption probability for particles larger than 0.5 $\mu$m, 90% at 4 kV, 99% at 12 kV and more than 99.9% up to 34 kV, so that a control interval of about 30 kV may be used for the ohmic heating of the filter without any substantial influence on the separation characteristic.

Figure 5:
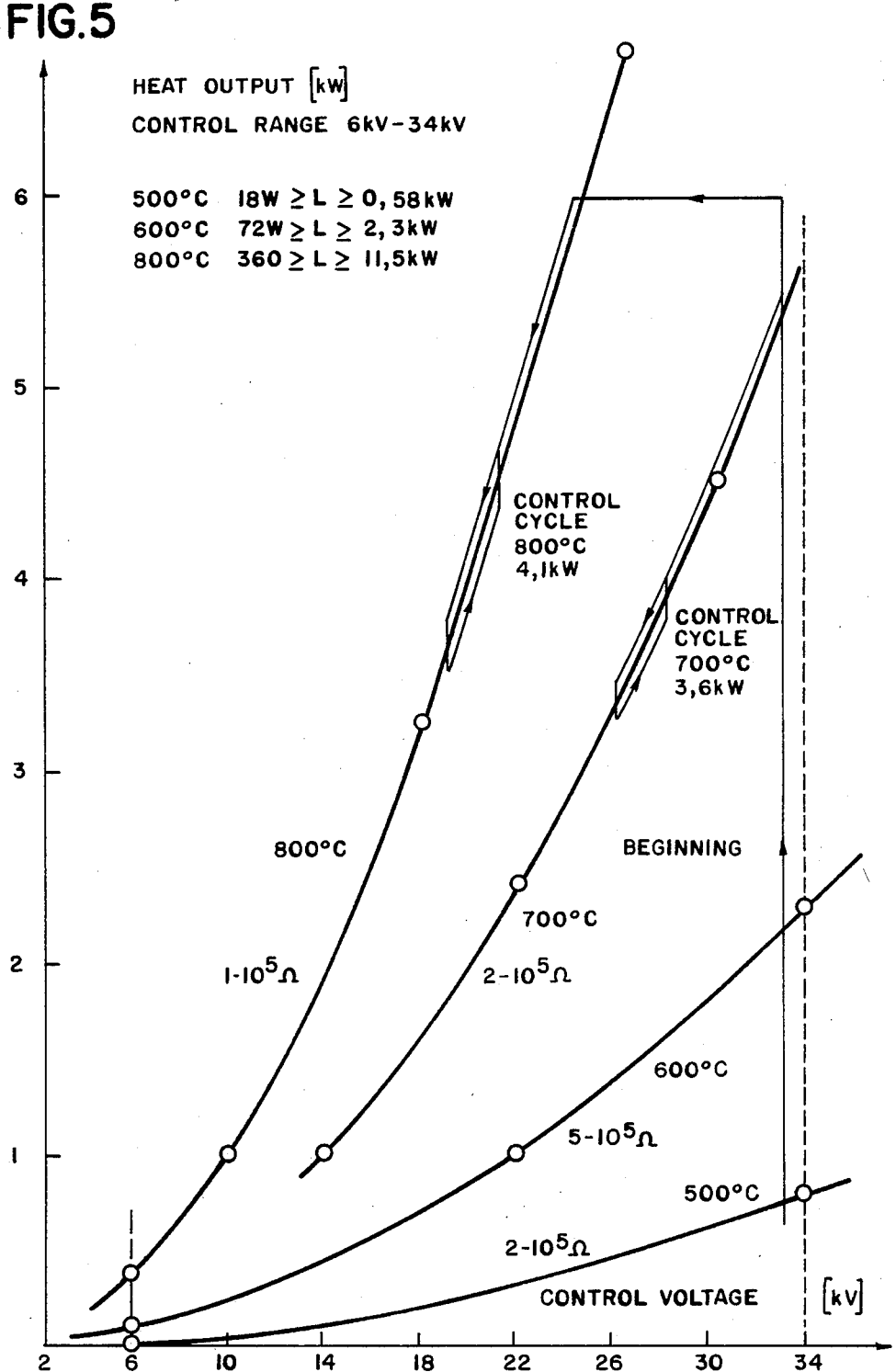
FIG. 5 is a diagram showing the characteristic lines of the heat output as a function of the control voltage in two different control cycles, i.e. a 3.6 kW heat output at 700° C. and a 4.1 kW heat output at 800° C., during the separation.

FIG. 5 shows the power absorbed by the filter at temperatures between 500° C. and 800° C. in dependence on the applied separation control voltage. Noteworthy is the control interval of 360 W at 6 kV to 11.5 W at 34 kV available at 800° C. while fully maintaining the electrostatic separation of the soot particles. Furthermore, the diagram shows two control cycle curves, one cycle at 700° C. wherein the filter transfers 3.6 kW to the flowing exhaust gas, less heat losses, and one at 800° C. wherein the filter transfers 4.1 kW to the flowing exhaust gas, less heat losses, in addition to the heat generated by the combustion of the soot particles. It has been assumed that the initial (beginning) cycle, i.e. the cycle until a temperature of 800° C. has been reached has a power absorption limit of the high voltage source at 6 kW.

Figure 6:
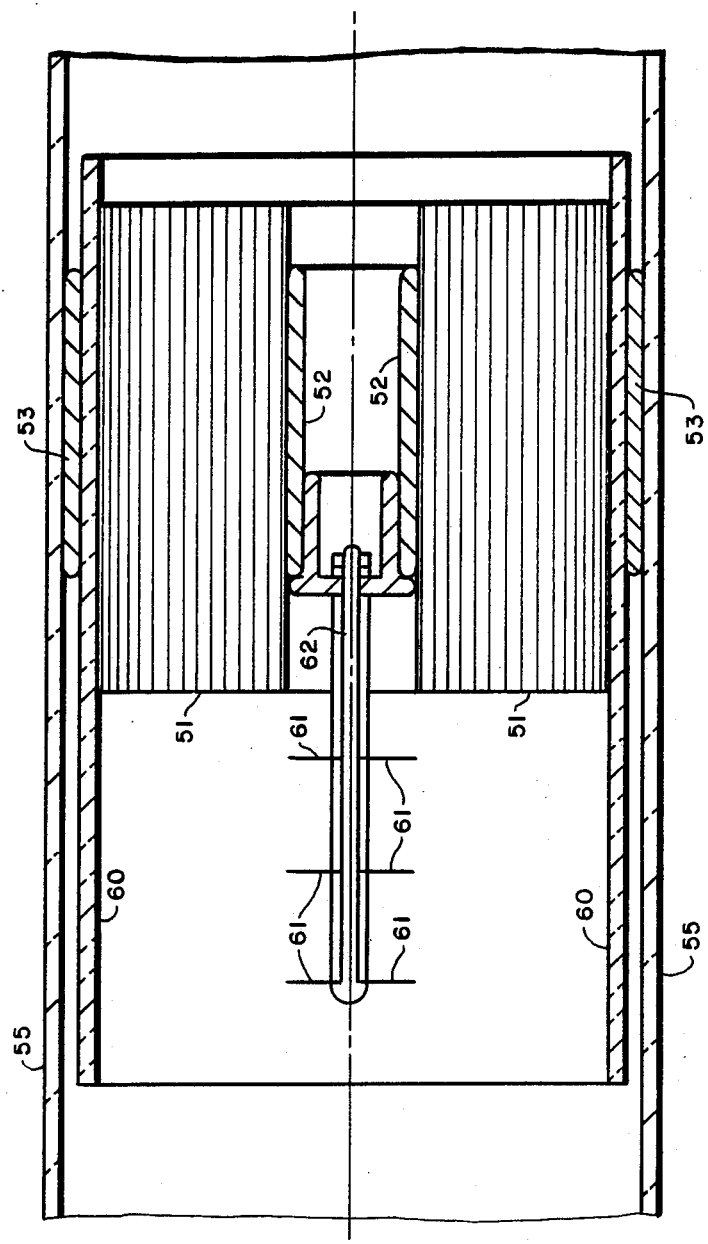
FIG. 6 shows an axial cross section of a diesel fuel exhaust gas honeycomb filter of annular structure.

FIG. 6 schematically illustrates an annular honeycomb filter 51 containing cylindrical high voltage electrode 52 in an axial bore thereof. The high voltage electrode carries disc-shaped corona discharge electrodes 61 mounted on electrode holder 62 inserted in the high voltage electrode. The discharge electrodes 61 define the gas discharge path for electrically charging the soot particles. The wall of outer housing 55 is the counter electrode for the corona discharge. Filter 51 is held in cylindrical sleeve 60 of ceramic material, which covers the circumference of the filter and separates the same from outer cylindrical electrode 53. Ceramic covering sleeve 60 also surrounds corona discharge electrodes 61 to avoid too strong a deflection of the soot particles to grounded outer housing 55 and, at the same time, provides also a heat insulation.

What is claimed is:

1. A method of separating soot particles from diesel fuel exhaust gases and burning the separated soot particles, which comprises the step of separating the soot particles by passing them in a direction of flow through a cellular filter open at both ends and comprised of honeycomb-shaped cells, and subjecting the soot particles in the cellular filter to a field extending perpendicularly to said direction before the soot particles are burned.

2. The method of claim 1, comprising the further step of controlling the amount of soot particles charged into the cellular filter.

3. The method of claim 2, wherein the amount of soot particles charged into the cellular filter is controlled by measuring the electrical resistance of the filter to the passage of the soot particles transversely to the direction of flow.

4. The method of claim 2, wherein the amount of soot particles charged into the cellular filter is controlled by comparing the electrical resistance of the filter to the passage of the soot particles in, and transversely to, the direction of flow.

5. A method of separating soot particles from diesel fuel exhaust gases and burning the separated soot particles, which comprises the steps of separating the soot particles by passing them in a direction of flow through a cellular filter open at both ends and comprised of honeycomb-shaped cells, subjecting the soot particles in the cellular filter to an electric field extending perpendicularly to the direction of flow before the soot particles are burned, and delivering ohmic heat to the cellular filter due to the inner resistance of the filter to the electric field applied to the filter.

6. The method of claim 5, comprising the further step of controlling the heat delivered to the filter.

7. The method of claim 5, wherein the electric field for separating the soot particles delivers the ohmic heat to the filter.

8. The method of claim 5, wherein the electric field is applied to the filter to deliver ohmic heat only after the filter has been charged with a predetermined amount of soot particles.

9. The method of claim 5, wherein the electric field is applied to the filter to deliver ohmic heat only after the filter has attained a predetermined operating temperature.

10. An apparatus for separating soot particles from diesel fuel exhaust gases, which comprises
    (a) a cellular filter open at both ends and comprised of honeycomb-shaped cells wherethrough the soot particles are passed in a direction of flow, and
    (b) means for applying a field extending perpendicularly to the direction of flow to the cellular filter,
        (1) the honeycomb-shaped cells having a cross section of substantially larger dimension perpendicularly to the direction of flow and to the extension of the field than perpendicularly to the direction of flow and in the direction of the extension of the field, and
        (2) the webs of the honeycomb-shaped cells extending in the direction of flow being very thin.

11. The apparatus of claim 10, wherein the ratio of the cross sectional dimension of the honeycomb-shaped cells perpendicularly to the direction of flow to that extending in the direction of flow is between 3:1 and 6:1.

12. The apparatus of claim 10, wherein the webs have a thickness not exceeding 0.5 mm.

13. The apparatus of claim 10, wherein the webs of the honeycomb-shaped cells extending in the direction of the field are staggered from each other is superposed rows of the cells whereby the cellular filter in a cross section extending perpendicularly to the direction of flow resembles the structure of a brick wall.

14. The apparatus of claim 10, wherein the field is an electric field, further comprising a pair of plate electrodes extending parallel to the direction of flow wherebetween a high voltage is generated to apply the electric field, the cellular filter being arranged between the parallel plate electrodes.

15. The apparatus of claim 14, wherein the cellular filter is of ceramic material and ceramic material envelops the plate electrodes.

16. The apparatus of claim 14, wherein the electrode plates are of electrically conductive ceramic material.

17. The apparatus of claim 14, wherein the cellular filter is of a material exhibiting a high electrical resistance in the direction of the electric field.

18. The apparatus of claim 10, wherein the field is an electric field and the filter is substantially annular, further comprising an inner electrode and an outer electrode wherebetween a high voltage is generated to apply the electric field, the electrodes conforming to the filter and the filter being so arranged between the inner and outer electrodes that wider webs of the cells extending parallel to the electrodes define smaller spaces therebetween and are connected by narrower webs of the cells extending in the direction of the field and defining larger spaces therebetween.

19. The apparatus of claim 18, further comprising a heat-resistant jacket surrounding the outer electrode.

20. The apparatus of claim 10, further comprising a gas discharge path preceding the cellular filter in the direction of flow for electrically charging the soot particles.

21. The apparatus of claim 20, wherein the discharge path is defined by parallel wire discharge electrodes and counter-electrodes arranged upstream thereof.

22. The apparatus of claim 21, wherein the counter-electrodes are cylindrical.

* * * * *